United States Patent Office 3,810,938
Patented May 14, 1974

3,810,938
NOVEL DIACRYLIC AND DIMETHACRYLIC ACID ESTERS
Werner Schmitt and Robert Purrmann, Starnberg, and Peter Jochum and Wolf Dieter Zahler, Hechendorf, Germany, assignors to ESPE Fabrik Pharmazeutischer Praparate G.m.b.H., Oberbayeen, Germany
No Drawing. Original application May 14, 1969, Ser. No. 824,701, now abandoned. Divided and this application Feb. 11, 1972, Ser. No. 225,671
Int. Cl. C07c 69/54
U.S. Cl. 260—486 R  3 Claims

ABSTRACT OF THE DISCLOSURE

New compounds of formula

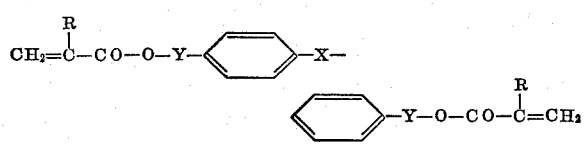

in which R is H or —$CH_3$, X is an alkylidene or the —$SO_2$— group, Y is an oxyalkylene group having between 2 and 5 carbon atoms, or an alkylidene group having between 1 and 5 carbon atoms are prepared. The compounds are intermediates for the preparation of polymers with a high degree of hardness and chemical stability and may be used for the preparation of a variety of articles, such as shaped articles coatings, cements, artificial teeth, dental fillings and other prosthetic articles.

---

This is a division of application Ser. No. 824,701 filed May 14, 1969, now abandoned.

This invention relates to novel compounds and specifically novel diacrylate and dimethylacrylate esters which are useful intermediates in the preparation of polymers characterized by superior properties. The novel compounds of this invention, in analogy with most olefinic compounds, in the presence of catalysts capable of forming free radicals, for instance peroxides, polymerize and give solid products. In general, the hot polymerization of methyl methacrylate proceeds practically to completion. The polymeric products, because of their strength and chemical stability, are suitable for the preparation of a variety of different articles together with coloring agents and fillers, the novel compounds of this invention are suitable for the preparation of molded bodies, such as dental replacement parts and teeth fillings.

When teeth fillings have to be prepared, the polymerization of the acrylate ester may only be conducted at room temperature or at body temperature. The main drawback of this cold polymerization is that a small portion of methyl methacrylate remains unpolymerized. It has been found that these residues of monomer gradually diffuse out from the fillings and cause damage mostly to the pulp of the teeth. For this reason, methyl methacrylate fillings, in general, are used only with fillings in the case of dead teeth.

For the purpose of improving the mechanical properties, particularly the abrasion resistance of the synthetic substances, some bifunctional esters of methacrylic acid have also been used, which have given three-dimensional cross-linked products. The application of one of these bifunctional esters of methacrylic acid to the preparation of dental fillings has been described in U.S. Pat. 3,066,112, where the ester of methacrylic acid is prepared by reaction of phenols, specifically, isopropylidenediphenol with glycidyl methacrylate. The bifunctional methacrylic acid esters so obtained, must be used together with a filler consisting mainly of silica and the filler is pretreated with a vinylsilane compound.

The polymers described in the preceding paragraph, prepared by the conventional polymerization of bifunctional methacrylic acid esters, that is, esters prepared by reaction of bisphenol with glycidyl methacrylate, are not completely inert to moisture, and in the presence of water or saliva, the mechanical strength is decreased and volume changes occur.

Also the bifunctional esters of methacrylic acid of the type of glycerine esters have been investigated but, in accordance with the same U.S. patent mentioned above, they are too highly viscous and must be mixed with methyl methacrylate or ethyleneglycol dimethacrylate or tetramethylene glycol dimethacrylate or other suitable low molecular weight reactive extenders, for the purpose of lowering the viscosity and making sure that the ingredients may be successfully used in dentistry. The result of this combination, however, is that also with these masses of bifunctional esters of methacrylic acid, it is necessary to add low molecular weight acrylic esters or similar substances. The drawback, as already discussed above, is that residues of unpolymerized monomeric materials of these low molecular weight extenders remain, which are toxic to the pulp of the teeth.

One object of this invention is to provide novel compounds which undergo polymerization to give products characterized by a high degree of harness and chemical stability.

Another object is to provide novel compounds which, when polymerized, give compositions which exhibit practically no tendency to absorb water. A further object is to provide new compounds which undergo essentially no change of volume during the polymerization process.

Still another object is to provide new compounds which may be easily and rapidly polymerized at high temperature and also in the cold or by the application of moderate heating, in the presence of conventional catalysts. The polymers prepared in the cold or by moderate heating have good stability, superior abrasion resistance, exhibit practically no tendency to absorb water and undergo practically no volume change during polymerization process.

The novel compounds of this invention are diesters of acrylic or methacrylic acid with a dihydroxy compound and have the general formula I

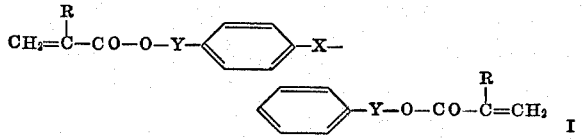

In formula I, R stands for a hydrogen atom or a methyl group, X represents an alkylidene or a —$SO_2$— group, and Y represents a oxyalkylene group having between 2 and 5 carbon atoms or an alkylidene group containing between 1 and 5 carbon atoms.

According to the preferred embodiments of the invention, X is the isopropylidene group and Y is a oxyalkylene group having between 2 and 3 carbon atoms or an ethylidene group, which, in some cases, may be substituted.

In general, the methacrylic esters are superior to the acrylic esters, because they are less susceptible to hydrolysis and because they exhibit better mechanical properties. Particularly suitable are the bifunctional methacrylic acid esters of the diols p,p'-dihydroxy-diphenylalkanes and p,p'-dihydroxy-diphenylsulfone. These diols, for example, may be prepared by reaction of known bis-phenols with epoxides or halohydrins. The bis-hydroxy-ethoxy- and bis-hydroxy-propoxy-derivatives of diphenylalkanes, such as for instance, 2,2-diphenylpropane,2,2-diphenylbutane or 1,1-diphenylcyclohexane are very advantageous.

The benzene rings of the dihydroxy compound of Formula I may also be substituted with lower alkyl or lower alkoxy groups, that is, with groups having between 1 and 4 carbon atoms, for instance, a methyl or a methoxy group. Substitution of the benzene rings has no effect on the ability to form esters with acrylic or methacrylic acid, nor does it affect the properties of the polymer.

According to a specific particularly suitable embodiment of this invention, the compound of formula I has the formula II below:

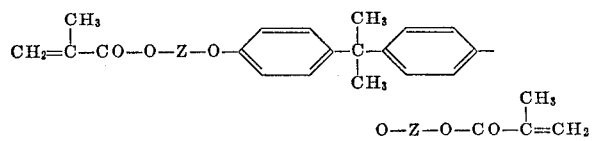

in which Z is an alkylene group having between 2 and 5 carbon atoms. When jacket crowns and anterior portions are to be manufactured by hot polymerization, the new diester of methacrylic acid of Formula III below has proved to be advantageous:

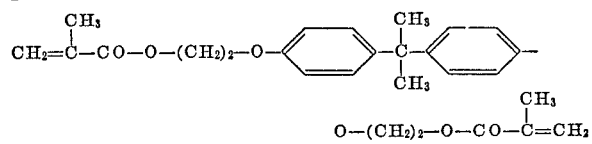

The bifunctional monomers in accordance with the present invention, in general, are little viscous liquids or relatively low-melting substances. They are prepared, in general, according to conventional methods of esterification and transesterification. For instance, the diols may be directly esterified with methacrylic acid in the presence of known esterification catalysts, such as, for instance, p-toluenesulfonic acid. The preparation of the bifunctional monomers may also be conveniently conducted by transesterification of methacrylic acid alkyl esters, for instance, the methyl ester in the presence of conventional basic or acid catalysts. Particularly advantageous is the preparation of the esters by reaction of reactive derivatives of acrylic or methacrylic acid, such as the halide or the anhydride. The addition of a dehydrating agent may also be advantageous. In all the operation, it is preferable to operate in an atmosphere of an inert gas and to use a polymerization inhibitor, such as, for instance, a 2,6-disubstituted phenol.

The polymerization of the bifunctional esters is conducted in conventional fashion in the presence of substances capable of forming free radicals, such as peroxides or azocarboxylic acid nitriles. As the peroxides, benzoyl peroxide, lauroyl peroxide, mono-t-butyl permaleate or t-butyl hydroperoxide, may be used. The azo carboxylic acid nitrile may be, among others, azo isobutyronitrile. For the preparation of replacement parts, to be used in repair work, the polymerization is carried out with lauroyl peroxide by heating the mass in a mold for a few hours at 90° C. or at temperatures up to 160° C. for a short period of time. It is preferable to conduct the polymerization at 120°–160° C. in a current of hot air, for the purpose of achieving the highest possible degree of cross-linking.

For the preparation of the dental fillings in the mouth, substances capable of acting as initiators at room temperature, particularly the known redox-systems are used. With these catalysts, the bifunctional esters in accordance with this invention, may be polymerized in the course of a few minutes at room temperature or at body temperature. It is preferable to use substances which have no tendency to discolor, such as for instance, known sulfone derivatives, such as hydroxy- or aminosulfones. It is also possible to use soluble salts of sulfinic acids with tertiary amines or quaternary ammonium bases, particularly in combination with peroxides. Suitable catalysts are also substances containing the so-called active —CH— group, such as 5-monosubstituted barbituric acid derivatives, or beta-diketones, in combination with known cocatalysts, for instance, traces of heavy metals and chlorine ions. The known system of benzoyl peroxide together with N,N-dimethyl-p-toluidine is satisfactory as a catalyst to cause rapid polymerization at room temperature; the resulting polymers, however, are little stable to discoloration. The redox-systems are suitable to form a layer against oxygen of the air, because the latter has a well known inhibitory effect.

One advantage of the new compounds of this invention is that it is not necessary to add highly fluid low-molecular weight acrylic or methacrylic esters during the polymerization. If the substances are solid at room temperature, as a rule, they have a low melting point, so that the manufacture of a variety of articles by hot polymerization in the molds may be easily conducted at a temperature above their melting point.

The polymerization as a rule is conducted in the presence of fillers. Particularly advantageous as fillers are, among others, finely divided polymethyl methacrylate, which is available in commerce in the form of small beads, glass fibers, quartz fibers, quartz powder, alumina and silicates. Pigments and coloring agents may also be added. The polymers prepared from the compounds of this invention may be used to make coatings, cements and shaped articles. They harden rapidly, by warming in the presence of polymerization catalysts.

The novel bifunctional esters of this invention are particularly valuable in the preparation of teeth fillings. Even if small amounts of the unpolymerized monomer remain, no risk of damage to the pulp of the teeth exists. This is in direct contrast with articles prepared from methyl methacrylate. The reason is that the relatively high molecular weight substances exhibit only a very small tendency to diffuse out from the polymerized material.

Another advantage of the compounds of this invention as intermediates to prepare polymers is that no changes in dimensions occur, even on prolonged standing in contact with water. In the case of pure methyl methacrylate, it is known in the literature that it swells by about 1% under the conditions existing in the human mouth. (See the book by Paul Weikart entitled "Science of Industrial Materials for Dentists," published by Carl Hanser-Verlag, Munich, 1966, at p. 162.)

Another significant advantage with the compounds of this invention, is that the ester functional groups are stable to hydrolysis. Also the polymers prepared according to this invention, exhibit a considerably superior abrasion resistance as compared with commercially available polymerization products, such as for instance, polymethacrylate.

The following examples are set forth below for the purpose of better illustration of the invention.

EXAMPLE 1

The diester, 2,2-bis-(p-(β-hydroxy-ethoxy-)phenyl)propane-dimethacrylate, was prepared by transesterification of 2,2-bis-(p - (β - hydroxy-ethoxy-)phenyl)-propane and methylmethacrylate, in analogy with the process described by John V. Schmitz in J. Am. Chem. Soc. 77, 1964 (1955) for the preparation of tetraethyleneglycoldimethacrylate. The substance, recrystallized from cyclohexane, melted at 44°–45° C.

EXAMPLE 2

The diester, 2,2-bis-(p-(β - hydroxy-ethoxy-)phenyl)-propane-diacrylate, was prepared by transesterification of 2,2 - bis - (p-(β-hydroxy-ethoxy-)phenyl)-propane with methyl acrylate, in accordance with the procedure described in Example 1. The substance had a melting point of 58°–60° C.

EXAMPLE 3

The compound 2,2-bis-(p-(β-hydroxy-ethoxy-phenyl)-sulfone was transesterified with methyl methacrylate in accordance with the procedure of Example 1. The product, 2,2-bis(p-(β-hydroxy-ethoxy-)phenyl) - sulfone - dimethacrylate, recrystallized from benzene-cyclohexane in the ratio of 1:1, had a melting point of 100°–102°.

EXAMPLE 4

A slimy paste was prepared from 56.8 grams of 2,2-bis-(p-(α-hydroxyethyl-)phenyl)-propane which had been prepared from 2,2-bis-(p-acetyl-phenyl)-propane, by reduction with NaBH$_4$, together with 140 ml. of benzene and 100 ml. of triethylamine. Under cooling at −5° C., there was added drop-wise 63 grams of methacrylic acid chloride and the mixture was kept under stirring one additional hour. After addition of 400 ml. of water, the benzene layer was separated, washed with dilute sulfuric acid sodium hydroxide and then with alumina.

After removing the solvent *in vacuo*, the product 2,2-bis-(p-(α-hydroxyethyl-)phenyl) - propane - dimethacrylate, 42.5 grams was obtained, in the form of a colorless liquid, which had a double bond equivalent of 208. The substance, in cyclohexane, exhibited two ultraviolet maxima in the region of 223 and 263 mμ. (εmol. 20 250 and 1210 respectively).

EXAMPLE 5

Methacrylic acid, 130 grams, was esterified with 167 grams of the diastereisomer mixture of 2,2-bis-(p-(β-hydroxypropoxy-)phenyl)-propane in 300 ml. of benzene, 6.8 grams of p-toluene sulfonic acid, and 0.3 gram of picric acid. The water formed during the reaction, was removed with boiling benzene over a period of 200 hours. The product was purified by treatment with sodium hydroxide, water and alumina in the usual manner. After drying and removal of the solvent *in vacuo*, a colorless oil was obtained, 102 grams, which exhibited a viscosity of 46 poises at 25° C. The substance, in chloroform, exhibited two ultraviolet maxima, at 278 mμ and 285 mμ (ε mol. 3.680 and 3.310 respectively).

EXAMPLE 6

To a mixture of 480 grams of sodium hydroxide, dissolved in 1.9 liters of water and 1.09 kg. of bis-phenol A, that is, 2,2-di-p-hydroxyphenyl-propane, dissolved in 1.2 liters of methanol, 1.14 kg. of 3-chloro-1-propanol was added dropwise at 65° C. and the mixture was heated at 80° C. for 5 hours. After cooling, the material was extracted with methylene chloride and the extract washed several times with sodium hydroxide. After drying and removal of the solvent, 1.350 kg. of a yellow oil was obtained, which recrystallized slowly. Dissolution and recrystallization from ethyl acetate gave 770 grams of 2,2-bis-(p-(γ-hydroxy-propoxy)phenyl)-propane in the form of colorless crystals of melting point 48°–49° C.

The dihydroxy compound was transesterified with methyl methacrylate according to the procedure described in Example 1, thus obtaining the bifunctional methacrylic acid ester. The substance was obtained as a colorless oil of viscosity 10 poises at 25° C. The substance in chloroform exhibited two ultraviolet maxima at 278 mμ and 285 mμ respectively (ε mol: 3.810 and 3.430 respectively).

EXAMPLE 7

To a mixture of 200 grams of sodium hydroxide, dissolved in 1 liter of water and 500 grams of p,p'-dihydroxy-diphenyl-sulfone, dissolved in 520 ml. of methanol, were added 474 grams of 3-chloropropanol at 65° C. The mixture was heated at 80° C. 7 hours. The crystals which separated on cooling, were purified by recrystallization from methanol water in the ratio of 5:1. The yield was 290 grams of bis-(p-(γ-hydroxy-propoxy)-phenyl)-sulfone of melting point 139°–141° C.

The esterification of this dihydroxy compound was conducted as in Example 5, with methacrylic acid and the product was purified in the usual fashion. The product was bis-(p-(γ-hydroxy-propoxy) - phenyl) - sulfone - dimethacrylate, 95 grams, which recrystallized from methanol, melted at 78°–79° C.

EXAMPLE 8

Bis-phenol A, that is 2,2 - di(p - hydroxy-phenyl-)propane, was reacted in known manner with an excess of pentene-1,2-oxide. The product, the mixture diastereisomers, 2,2-bis-(p-(β-hydroxy - pentoxy-)phenyl)propane was obtained as a yellow-brown, semisolid mass, which was obtained as a colorless substance by distillation B.P.: 192°–210° C./0.005 mm. The OH— equivalent was 207.

Esterification was conducted from 113 grams of the dihydroxy compound, with methacrylic acid in the manner as described in Example 5 and the product was purified in the usual manner. After evaporation of the solvent *in vacuo*, 84 grams of a colorless oil was obtained, which, in chloroform exhibited ultraviolet maxima in the region 278 mμ–286 mμ (ε mol.: 3.720 and 3.330 respectively).

What is claimed is:

1. A compound of the formula

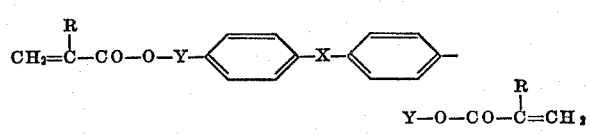

wherein R is hydrogen or methyl, X is —SO$_2$— group, Y is an oxyalkylene group of 2–5 carbon atoms or an alkylidene group of 1–5 carbon atoms and the benzene rings are unsubstituted or substituted with alkyl of 1–4 carbon atoms or alkoxy of 1–4 carbon atoms.

2. The compound according to claim 1 which is bis-(p-(β-hydroxy-ethoxy-)phenyl)-sulfone-dimethacrylate.

3. The compound according to claim 1 which is bis-(p-(γ-hydroxy-propoxy)-phenyl)-sulfone-dimethacrylate.

References Cited

FOREIGN PATENTS

| | | | |
|---|---|---|---|
| 657,894 | 2/1963 | Canada | 260—486 |
| 1,089,867 | 11/1967 | Great Britain | 260—486 |

LORRAINE A. WEINBERGER, Primary Examiner

P. J. KILLOS, Assistant Examiner

U.S. Cl. X.R.

106—35; 260—41 A, 41 B, 41 C, 41 AG, 47 UA, 49

PO-1050
(5/69)

UNITED STATES PATENT OFFICE
CERTIFICATE OF CORRECTION

Patent No. 3,810,938     Dated May 14, 1974

Inventor(s) Werner Schmitt, Robert Purrmann, Peter Jochum and Wolf Dieter Zahler It is certified that error appears in the above-identified patent and that said Letters Patent are hereby corrected as shown below:

In the introductory information, the following addition is made:

--Claims priority, application Switzerland, May 15, 1968, 7178/68.--

Signed and sealed this 5th day of November 1974.

(SEAL)
Attest:

McCOY M. GIBSON JR.
Attesting Officer

C. MARSHALL DANN
Commissioner of Patents